(12) United States Patent
Wicherski

(10) Patent No.: US 11,767,234 B2
(45) Date of Patent: Sep. 26, 2023

(54) METHOD FOR OBTAINING CLEAN DRINKING WATER FROM DEWATERED BIOLOGICAL PRODUCTS AND A DEVICE FOR DEWATERING SUCH PRODUCTS

(71) Applicant: Jan Wicherski, Poznan (PL)

(72) Inventor: Jan Wicherski, Poznan (PL)

( * ) Notice: Subject to any disclaimer, the term of this patent is extended or adjusted under 35 U.S.C. 154(b) by 0 days.

(21) Appl. No.: 17/840,360

(22) Filed: Jun. 14, 2022

(65) Prior Publication Data
US 2023/0212034 A1     Jul. 6, 2023

(30) Foreign Application Priority Data
Dec. 30, 2021    (PL) .......................................... 440064

(51) Int. Cl.
*C02F 1/18*        (2023.01)
*B01D 3/02*        (2006.01)
(Continued)

(52) U.S. Cl.
CPC .................. *C02F 1/18* (2013.01); *B01D 3/02* (2013.01); *B01D 5/006* (2013.01); *C02F 2103/26* (2013.01)

(58) Field of Classification Search
CPC ... B01D 3/02; B01D 5/006; C02F 1/18; C02F 2103/26
See application file for complete search history.

(56) References Cited

U.S. PATENT DOCUMENTS 3,511,297 A  *  5/1970  Webb ...................... F26B 9/066
                                                           159/16.1

5,939,116 A  *  8/1999  Ono ....................... F26B 25/063
                                                           34/267

(Continued)

FOREIGN PATENT DOCUMENTS

| EP | 3 335 574 A1 | 6/2018 | |
| KR | 101753186 B1 * | 2/2017 | ............. B01D 5/006 |
| WO | WO 89 08229 | 9/1989 | |

OTHER PUBLICATIONS

Machine Translation obtained Feb. 23, 2023 of KR-101753186-B1 provided by PE2E Search. (Year: 2023).*

(Continued)

*Primary Examiner* — Jonathan Miller
(74) *Attorney, Agent, or Firm* — Cherskov Flaynik & Gurda, LLC

(57) ABSTRACT

A method for obtaining pure drinking water from dewatered biological products is described. The process is carried out in a hermetic dewatering chamber isolated from the ambient atmosphere and in parallel with a process during which dried products are placed on drying trays. All the process parameters, such as temperature, humidity, and appropriate pressure inside the chamber, are controlled. The vapor generated during the product dewatering process, released from the products, is continuously removed from the dewatering chamber through the upper opening, exits through the outflow channel, and enters through the condenser. The process of obtaining clean drinking water is carried out outside the chamber and is conducted in several stages: vapor passes through disinfectant grids, vapor flows to a condenser cooled with ice water, and the vapor condenses on densely arranged lamellas. The condensate is then pumped to a discharge tub.

8 Claims, 6 Drawing Sheets

(51) Int. Cl.
    *B01D 5/00*         (2006.01)
    *C02F 103/26*     (2006.01)

(56) References Cited

U.S. PATENT DOCUMENTS

| | | | | |
|---|---|---|---|---|
| 6,054,686 | A * | 4/2000 | Pauly | A21B 1/26 |
| | | | | 219/400 |
| 6,068,874 | A * | 5/2000 | Grocholski | A23B 4/031 |
| | | | | 426/465 |
| 6,796,223 | B2 * | 9/2004 | Jiang | F26B 21/06 |
| | | | | 219/400 |
| 10,194,684 | B2 * | 2/2019 | Weaver | A23J 1/006 |
| 2004/0031398 | A1 * | 2/2004 | Jiang | F26B 15/205 |
| | | | | 99/476 |
| 2012/0067069 | A1 * | 3/2012 | Wells | A23L 3/40 |
| | | | | 62/93 |
| 2012/0328753 | A1 * | 12/2012 | Mondello | A23L 5/15 |
| | | | | 426/523 |
| 2014/0075776 | A1 | 3/2014 | Potter et al. | |
| 2018/0168203 | A1 * | 6/2018 | Wicherski | F26B 3/04 |
| 2020/0200475 | A1 * | 6/2020 | Durance | F26B 5/06 |
| 2022/0362684 | A1 * | 11/2022 | Lautenschläger | B01D 3/38 |

OTHER PUBLICATIONS

Search Report for Polish Application P 440064, dated Sep. 5, 2023 by the Patent Office of the Republic of Poland.

\* cited by examiner

METHOD FOR OBTAINING CLEAN DRINKING WATER FROM DEWATERED BIOLOGICAL PRODUCTS AND A DEVICE FOR DEWATERING SUCH PRODUCTS

The subject matter of the invention is a method of obtaining clean drinking water from dewatered biological product and a device for dewatering such products, particularly soft food products, especially from fresh or frozen fruit, vegetables and mushrooms.

A method of dewatering biological products that utilises the pressure drying method, where the product is subjected to a gas medium forced-flowing in a closed system at an appropriate pressure over the product, with the temperature difference between the medium circulating in the system and the product being dried until the moisture content of the product is reduced to the desired level, and where the dewatering process is carried out at a constant ambient temperature around the raw material, preferably higher than the storage temperature of the raw material but lower than the degradation temperature of its components is known from patent description PL.237467 (B1), published also as European patent application EP.3335574 (A1). In accordance with the essence of the invention, patent no. PL.237467 (B1), the process is conducted in a dewatering chamber, where the product is placed on drying trays located on at least one rack with shelves, equipped with heating surfaces, whereby at the beginning of the drying process nitrogen at a temperature from 30° C. to 50° C. and pressure from 1.1 do 1.4 Pa inside the dewatering chamber is used as a gas medium, while the raw material is simultaneously subjected to two processes—the process of blowing the batch of the biological product with the gas medium at positive pressure and at a fixed temperature of 30° to 50°, and the process of desorption drying induced by heating surfaces of the shelves.

The dewatering process is conducted in the following stages:
  the initial stage consists in preparing the products to be dried, whereby, for this purpose, the biological products are segregated into classes, according to the characteristic they have in common (i.e. berries are segregated according to their diameter), next the segregated products of a determined class are placed on the appropriate drying tray so that the tray's perforation holes match the size of the product placed on the heating surfaces of the rack shelves and then the dewatering chamber is closed;
  in the subsequent stage injectors are activated to supply nitrogen into the dewatering chamber, and there is a determined interval (not shorter than 9 minutes) that preceeds the following stage;
  all the elements of the appliance are started and the setting and control system automatically controls all the parameters of the dewatering process, such as temperature, humidity and appropriate pressure inside the dewatering chamber, starting the dewatering process of the biological product, which, with the use of the blowing and heating systems, undergoes two processes at the same time—the process of drying the raw material with a gas medium that flows through the batch of a biological product at positive pressure and at an appropriate temperature, and the desorption drying process, which consists in heating the product to the temperature of 40-50° C. by the heat released from the heating system;
  after the completion of the dewatering process, the setting and control system automatically stabilises all the parameters, including the temperature and pressure inside the chamber and the whole device is switched off, the dewatering chamber door is opened and the drying trays with the dried load are taken out.

The heating liquid flowing in the heating system heats the heating surfaces of the shelves in contact with the drying trays, which in turn heat the biological product placed on them until the moisture content of the product is reduced to the desired level.

As indicated in the patent description PL.237467 (B1)—during the dewatering process, a humid gas medium originating from the product being dewatered is continuously removed from the dewatering chamber through the upper opening so that it escapes through an outflow pipe into the flow channel, from where it goes to a condenser located above this dewatering chamber, after which it returns in a closed circuit via an inflow pipe to the system and is forced by fans back into the dewatering chamber.

The condensate, resulting from the condensation of water vapour, is directed from the condenser to a special tank located outside the dewatering chamber, from where it is then disposed of as process waste.

Biological products to be dried are cut into such forms as halves, quarters, cubes, slices or strips and placed on drying trays in single layers.

It is desirable that the biological products to be dewatered are fresh, raw (at a temperature up to about plus 10° C.) or even more preferably frozen (at a temperature up to minus 30° C.), which protects the raw material from enzymatic changes.

Before initiating the dewatering process, the rack with the heating surfaces of the shelves is placed outside the dewatering chamber where the drying trays are placed on the heating surfaces and only then the loaded rack is moved into the dewatering chamber.

The gas medium flows through the batch of the dried raw material from bottom to top, through the perforation holes of the drying trays.

The subject matter of the invention, known from the patent description PL.237467 (B1), is furthermore a device for dewatering biological products, especially foodstuffs, by the method according to the invention. According to patent description PL.237467 (B1) the device is a physically and thermally closed unit, with a hermetic dewatering chamber fitted with a door and connected through pipes to a condenser located outside, inside the chamber there are a heat exchanger connected with a heat generator located outside the unit as well as horizontal drying trays stacked one over another. The device is equipped with means for supplying the required gases and/or bacteriostatic agents to the dewatering chamber and with a system for forcing the gas medium to flow at a predetermined pressure; furthermore, the device has an automated setting and control system for controlling the parameters of the dewatering process.

There is an externally located condenser connected by a hose to a water tank, which stores the water obtained as a result of condensation. There is a scale on the water tank to control the amount of evaporated water that comes from the biological product being dewatered. According to the invention known from patent description PL.237467 (B1) the device has a heat exchanger in the form of the entire support structure of the rack filled with heating liquid, the heat exchanger being detachably connected to the heater located outside the dewatering chamber by a supply and outflow pipeline. The rack has shelves with heating surfaces, on which drying trays with dewatered raw material are placed. Furthermore, the device includes a nitrogen supply system for introducing nitrogen into the dewatering chamber including a nitrogen container located outside the dewatering chamber. The container is connected by cables to injectors located near the floor of the drainage chamber. In the rear wall of the dewatering chamber, at the height of each tray shelf, there are fans—preferably turbine ones—with individual capacity control, which blow a gas medium into the dehydration chamber, into the spaces between the drying trays.

The connection of the rack to the supply and outflow pipes is detachable, utilising a coupling, preferably self-closing.

The drying trays are perforated and the perforation may be in the form of punched, openwork, mesh or similar elements.

In addition, the drying trays are covered with a protective layer and framed with an insulating element.

The entire dewatering chamber has thermal insulation, either in the form of a layer of polyurethane foam or polystyrene. Additionally, it is insulated with a moisture-proof layer, while the inside is lined with waterproof elements.

One of the advantages of the presented device for dewatering biological products, according to the invention known from patent description PL.237467 (B1) is that the use of two systems—a blowing and a heating system—allows for uniform and at the same time the most and effective drying of biological products in the entire dewatering chamber, so as to prevent the frequent problem of overheating of products, which has been a significant technical problem for years, and always results in a loss of the product's nutritional value, distortion of the basic chemical composition of the raw material, as well as changes to its taste, aroma and colour.

It is known that the intensity of drying varies and is dependent on the particular phase of the drying cycle. While in the first phase the surface moisture of the product is removed (from the layers close to the surface), in the next phase of the cycle the inside of the product is dried and then the water vapour has to diffuse through the thick layers of the product and with too fast and intensive drying, the diffusion of water from the deeper layers does not keep up with the diffusion from the surface of the product, which results in the formation of a type of hard, impermeable shell on the surface of dried products and, at the same time, insufficiently dried inside of this product.

To obtain the proper drying speed, heat must be applied intensively while maintaining small temperature differences to prevent overheating and loss of nutritional value of the product.

Moreover, a significant improvement of the process of drying biological products in a closed system, in the device designed according to the presented invention, was the introduction of additional heating between the heating surfaces of the rack, which allows for intensive drying of soft products while maintaining small temperature differences. Furthermore, one of the definite advantages of the device according to the presented invention is the possibility of using simultaneously different drying trays, with different perforations and shapes, which allow for drying sorted products and, as a result, allow for optimal drying to be obtained.

Thanks to the application of an innovative way of dewatering biological products using the dewatering device according to the invention, known from patent description PL.237467 (B1), very good parameters of the dried product were achieved. The design of the machine allows for drying any type of food raw materials up to dry matter. The dried raw material has a very low water content (even as low as 1-2%, which means the parameters are identical to those of lyophilization), which allows for protecting the product from spoilage. It is characterized by a lack of hygroscopicity (the product does not absorb moisture from the environment) and is not attacked by molds. It also retains its natural shape, structure and all its values—vitamin, aroma and taste qualities. Above all, it is characterized by crunchy crust and slightly moist inside with soft and at the same time crunchy, porous crumb structure.

At the same time it retains moisture for longer, which gives the impression of freshness of the product even after many days or weeks. There is only a slight change in the color shade of the dried product compared to the fresh product. The obtained dried product is also characterized by quick re-hydration, i.e. it can be easily restored to its initial state by rehydration and reaches its initial state just a few minutes after soaking in water.

The device, which is a drier according to the invention known from patent description PL.237467 (B1), can be used for drying all crops by small producers and in households, especially for dewatering soft fruits and vegetables, i.e. fruits with the entire pericarp being fleshy, such as berries, or a pericarp at least partially fleshy, such as drupes or soft vegetables, including Solanaceae, cucurbits and cabbage family or onion species. The developed drying method allows for very effective dewatering of such fruits as cranberry, black and red currant, chokeberry, blueberry, grape, pear, apple, pineapple, watermelon, sweet cherry, cherry, plum, blackberry, raspberry, strawberry, peach, apricot and such diverse vegetables as pumpkin, tomato, cucumber, olive, potato, pepper, broccoli, cauliflower, Brussels sprouts, peas, onion, leek, etc. This method also works well for drying herbs (for example, nettles, chives, dill) and mushrooms. However, it cannot be utilised in a high-capacity, large-scale industrial production cycle.

The purpose of the invention was to improve the preceding invention in such a way that the water formed from the condensed moisture extracted from the products subjected to the drying process in the device known from the PL.237467 (B1) document in question would not be wasted. Until now, water accumulated in a tank located outside the drying chamber was considered a by-product of the process of dewatering biological products and not used in the further technological process. However, the designer of the solution was interested in an efficient recovery of the water, especially as being fit for further human consumption, with the improvement of its quality and physicochemical, microbiological and organoleptic properties, including both taste and smell.

DETAILED DESCRIPTION

Figure 1:
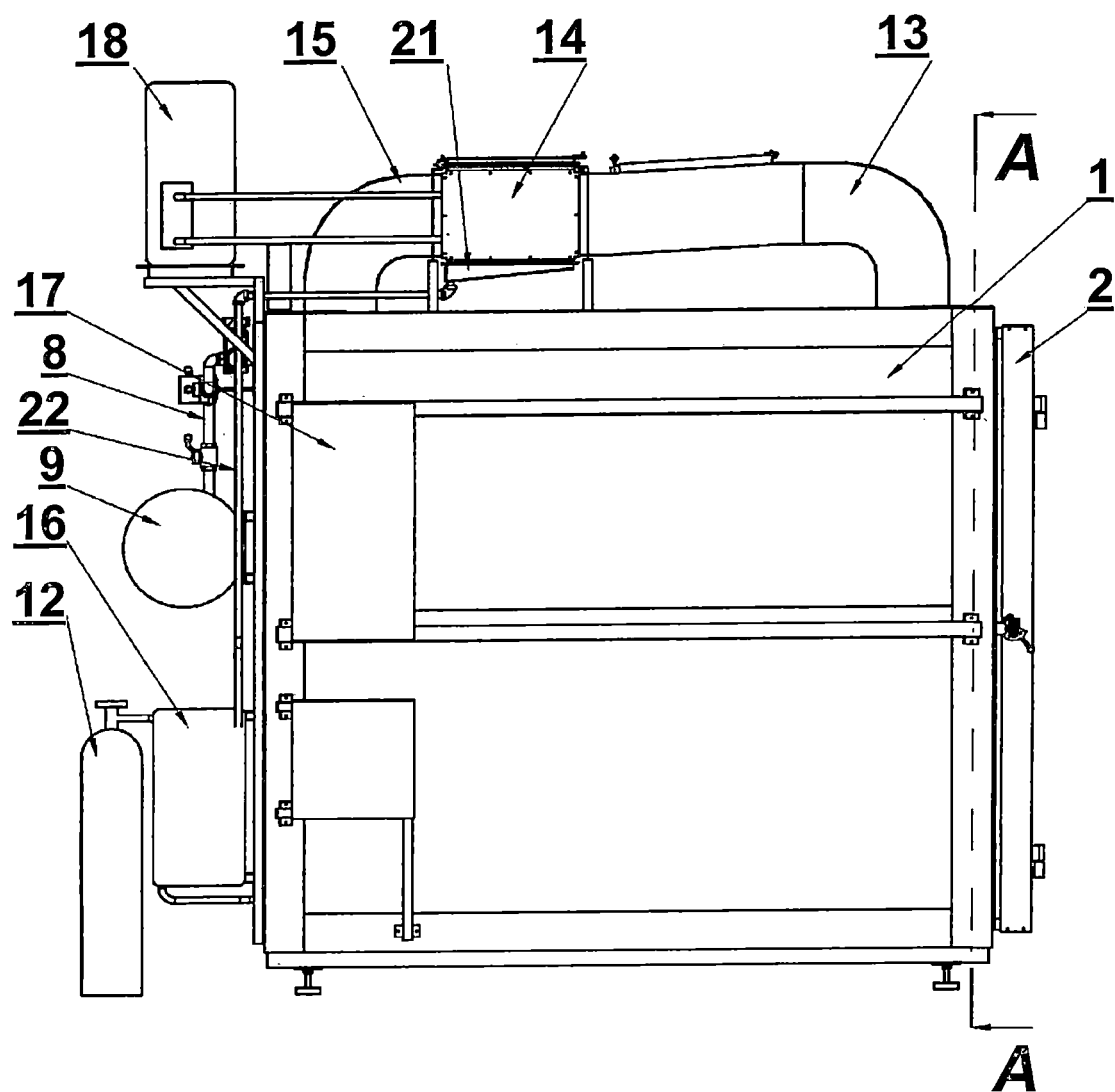
FIG. 1 depicts a schematic overview of one embodiment of the invention.

The subject matter of the present invention is a method for obtaining pure drinking water from dewatered biological products, which accompanies a process for dewatering these products, carried out in a hermetic dewatering chamber isolated from the ambient atmosphere, and which is carried out simulataneously with a process during which dried products placed on drying trays arranged on at least one rack with shelves having heating surfaces, are tightly closed inside a hermetic dewatering chamber, the products having already undergone an initial phase of being subjected to a gas medium in the form of nitrogen at temperatures from 30° C. to 50° C., at a pressure from 1.1 to 1.4 Pa inside the dewatering chamber, after which the actual dewatering phase begins and is initiated by activating all the components of the device, where all the parameters of the dewatering process such as temperature, humidity and appropriate pressure inside the dewatering chamber are controlled automatically by a setting and control system, after which phase, the raw material is subjected to two simultaneous processes with the use of the blowing and heating systems, i.e., the process of being blown with a gas medium that flows through a batch of biological product at positive pressure and a predetermined temperature of 30° to 45°, and the process of desorption drying induced by shelf heating surfaces, which involves heating the product to a temperature of 40-45° C. by the heat released from the heating system and the vapour generated during the product dewatering process, obtained from the dewatered products is continuously removed from the dewatering chamber, through an upper opening, it flows out through the outflow pipe and through the flow channel (air duct) enters the condenser, located outside the dewatering chamber, and the condensate is directed to a special container, also located outside the dewatering chamber.

The essence of the method of obtaining clean drinking water from dewatered biological products proceeds in several stages, in which:
  a) warm vapour, originating from the dewatered products, escaping from the dewatering chamber continuously through the upper opening into the outflow pipe forming part of the flow channel located outside, i.e. outside the dewatering chamber, flows through disinfectant wire grids placed in this channel, optionally made of copper or silver (i.e. silver-coated) wire, depending on the raw material being dried,
  b) then the vapour flows towards the condenser made of acid-resistant steel which is cooled down by ice water from a refrigerating unit, whereby as a result of the cooling of the condenser, at the point where warm gases leaving the dewatering chamber come into contact with the condenser, the "dew point" occurs, at which—at the temperature of the cooled condenser ranging from +5° C. to +15° C.—the process of gas condensation begins,
  c) The vapour condenses on the densely arranged lamellas made of acid-resistant steel and located inside the condenser,
  d) next, fans pump the vapour, and the condensate generated from the condensation of the vapour is directed in sterile conditions from the condenser to a condensate discharge tub,
  e) The condensate goes into a flow pipe (i.e. pipes or a hose) and flows in sterile conditions into a special water storage tank, from where it can be drawn for further processing or directly to the packaging stage.

The subject of the invention is also a device for dewatering such products, provided with elements allowing for extracting crystal clear water from the dewatered biological products, the elements being an improvement on the design of the device constituting a physically and thermally closed unit, with a hermetic drainage chamber fitted with a door and connected by pipes with a condenser located outside the chamber, with a heat exchanger inside the chamber, connected by supply and outflow pipes to a heat generator located outside the drainage chamber, with the said heat exchanger having the form of a rack with shelves with heating surfaces, its entire supporting structure being filled with heating liquid and having shelves on which drying trays filled with dewatered biological raw material are stacked one over another. Moreover, the device is equipped with a system supplying the required gases (nitrogen) and bacteriostatic agents into the dewatering chamber as well as with a system for forcing the flow of the gas medium at a certain pressure; in the rear wall of the dewatering chamber, at the height of each tray shelf, there are fans, preferably turbine ones, with individual capacity control, blowing a gas medium into the dewatering chamber, in the spaces between the drying trays. In addition, the unit has an automated setting and control system to control the process parameters as well as a tank, also located outside the dewatering chamber, designated to collect the condensate.

The essence of a device for dewatering biological products, with the ability to simultaneously extract pure drinking water from the dewatered products, consists in the solution where-them are at least two replaceable disinfectant wire grids, optionally made of copper or silver (i.e. silver-coated) wire, placed in a flow channel located above the dewatering chamber through which a gas medium flows in a closed circuit, out of which at least one grid is located in the outflow channel, constituting part of the flow channel, in the space between the upper opening of the dewatering chamber and the condenser, which is a vessel made of acid-resistant steel located in the middle of the flow channel, and at least one disinfectant wire grid is located in the inflow channel which is part of the flow channel, in the space between the condenser and the upper inflow opening of the dewatering chamber (through which the condensate-fire vapour returns into the dewatering chamber). Apart from that, outside the dewatering chamber, at a side adjacent to the upper opening of the dewatering chamber (which is the dewatering chamber inflow channel, being part of the flow channel), there is a refrigerating unit that cools the condenser and causes the "dew point" at which the gas condensation process begins. Inside the condenser there are densely mounted lamellas, made of acid-resistant steel, connected to each other by a tubular spiral. Under the condenser there is a condensate discharge tub, also made of acid-resistant steel, connected to a sterile flow duct, which may be a hose pipe or a system of pipes, and which is connected to a special sterile water storage tank.

Owing to the solution according to the invention, during the dewatering process of biological products it is possible to obtain two wholesome products at the same time, i.e. dry mass, formed as a result of the process of dewatering carried out in a hermetic dewatering chamber (drying chamber), and a liquid product, recovered from the dried products which, as a result of drying is collected in a specially adapted water reservoir. Until now, the condensate vapour produced in the condenser during the product drying process that flew into the water storage tank was subsequently disposed of as sub-standard production waste.

However, the creator of the solution observed that from one tonne of biological product subjected to the process of dewatering according to the method and with the use of the device according to his first, previously developed invention, with maintaining evaporation temperature of up to 40° C., it is possible to recover as much as 900 litres of water (which constitutes as much as 90% of the mass of the dried products). This is water that has values that can be used in further technological process, which has been wasted so far. Preliminary organoleptic testing of the recovered water revealed favorable taste and odor characteristics, evidently determined by the particular product undergoing the dewatering process. Therefore, the creator of the solution decided that the water in question must have not only favourable organoleptic, but—above all—physicochemical and microbiological parameters, and therefore improved his own solution covered by patent no. PL.237467 (B1).

All the improvements introduced by the creator of the solution in question, which are de facto improvements of his previous, earlier device, acting together bring—as it turned out—unexpectedly desirable results. Namely, the replaceable wire grids (located above the dewatering chamber in at least two places in the flow channel through which the gas medium flows in closed circulation) constitute a barrier with bactericidal and disinfectant (antiseptic) properties through which the vapour escaping from the dewatering chamber penetrates. Because of that, the wire grids are optionally made of copper or silver-coated wire. At the same time, the choice of material from which they are made depends on the raw material (biological product) that is currently undergoing the drying process. This is because the creator observed that copper grids, which theoretically would be the most desirable as copper is known for its antiseptic properties, causing the elimination of fungi, bacteria and mold harmful to human health, are not suitable for use with certain raw materials, especially those with intense properties such as strong acidity. For example, the use of copper grids does not work well for drying sauerkraut (as the copper reacts strongly with the water vapour, copper oxides are released, the grid goes dark, and the water recovered from the dried sauerkraut is not crystal clear, but has a bluish color). In this case, a wire grid coated with pure silver works well to disinfect the vapour escaping from the drying chamber in which the sauerkraut is dried.

all the elements making up the installation for recovering water from products subjected to the drying process in the dewatering chamber (drying chamber) are made of acid-resistant steel or copper, because only then they act antiseptically, kill bacteria and ensure the sterility of the entire "water" installation (i.e. starting from the stage of water forming from the vapour), i.e:
  a) acid-resistant lamellas (slats) are connected to each other similarly to the heater, with a tubular spiral, on which the vapour—entering the condenser from the flow channel—condenses, turning into water,
  b) all water storage vessels used for gathering water, such as the condenser, the condensate discharge tub for the condensate located under the condenser as well as the tank—water storage reservoir are acid-resistant,
  c) acid resistant are also flow connections (pipes) connecting the condenser and the condensate discharge tub with the tank—water storage reservoir, a cooling unit, preferably a refrigerating unit (which may be any cooling system utilising chilled water as the cooling medium), located outside, i.e. on a side wall of the dewatering chamber, is arranged to cool the condenser and cause the "dew point" where the warm gases leaving the dewatering chamber come into contact with the condenser, and—at the temperature of cooled condenser remaining within the range from +5° C. to +15° C.—the process of water vapour condensation begins.

The applied improvements make it possible to treat the water obtained in the process of dowatering any biological products as intended for human consumption or human use—so that it has excellent quality, is not cloudy but crystal clear, is free from bacteria, mould and fungi and at the same time has satisfactory taste and smell characteristics. It turned out that the water recovered from drying specific fruits, vegetables, mushrooms, herbs, or any other biological products, always has the taste, smell, and properties of the specific dried product.

For example, water from dried blueberries acquires the taste and smell of blueberries, becoming blueberry water, which can be used for further production of juices, nectars, etc.; similarly, water from strawberries acquires the taste and smell of strawberries, becoming strawberry water. Water from dried pumpkin has the taste and smell of pumpkin—becoming pumpkin water, perfect for use as a base for vegetable soups, including pumpkin soup, and for example, water extracted from treated dried mushrooms—is definitely mushroom water that may be used as base for mushroom soups or sauces. Sauerkraut water—has the taste and smell of this product and can be a ready-made, healthy drink, a rich source of antioxidants and vitamins and minerals, or even as a natural antibiotic—so it is certainly suitable for further technological processing.

The solution allows for drying any biological product, which always results in two independent products, i.e. the dried product (dry mass) and water obtained from the product. An unobvious product can be, for example, fish backbones (which are in fact a rich source of vitamins, minerals, proteins, phosphorus and calcium)—completely undervalued and so far treated as production waste. Interestingly, as a result of the process of dewatering fish backbones in the presented device with the use of the method according to the present invention, a dry mass may be obtained, which in a further production stage may be simply powdered and packaged as a dietary supplement in powder or in tablets, being a concentrated source of vitamins, minerals and other substances having a nutritional or other physiological effects and at the same time it is possible to obtain a liquid—fish water, whose spectrum of use is even wider (from with the already-mentioned dietary supplements to additives to soups or sauces). Both forms, i.e., the dried product (dry matter) and water will have excellent human health promoting properties and will be suitable for human consumption.

The liquid form of the dried biological product (obtained by means of a device known from the present invention, during the process of dewatering the biological product in the drying chamber) may already be a finished product, requiring only appropriate packaging, but may also be suitable for use in another technological process. In the latter case, the technological process is not necessarily limited to the food industry, because, for example, the obtained liquid product may be suitable for use in other branches of the economy, for example in the cosmetics industry. The designer of the presented solution carried out with his device, among other processes, the process of drying the snail mucus (obtained periodically, in a safe and non-invasive manner, not having a harmful effect on the health of the animals), as a result of which he obtained a dried product (dry mass) and a liquid condensate of this raw material. The results of this experiment turned out to be very promising for the future, as snail mucus is, not without a reason, the "wonderful discovery" of cosmetology of recent years, a raw material considered to be extremely valuable and desirable as an ingredient of cosmetic care products, due to the richness of valuable components contained in snail mucus, such as collagen, elastin, allantoin, glycolic acid and vitamins A, C and E with antioxidant and protective effects and because snail mucus stimulates skin cells to an increased production of collagen and elastin fibers, improving its firmness, thus having smoothing and firming properties (e.g. shows anti-wrinkle effects), and in addition being deeply moisturizing and nourishing as well as showing intensive regenerative, anti-inflammatory and healing effects (facilitates epidermal renewal and healing, alleviates redness, reduces the tendency to allergies and helps in the care and treatment of skin with juvenile acne).

Microbiological laboratory testing of water samples, coming from the process of drying various biological products (e.g. chokeberries, blueberries, pickled onions, sauerkraut, and even sprouts of spotted thistle, known for its medicinal properties, including support of the immune system and antiviral activities), conducted at the District Sanitary and Epidemiological Station in Torun, showed very satisfactory results, each time confirming that the recovered water was fit for human consumption, as:

testing the water for microorganisms of low pathogenicity to humans, with the plate method by depth inoculation at 22° C., detected no microorganisms [i.e., the test result indicated—0 cfu/1 ml], testing the water by membrane filtration for fecal contamination did not detect any presence of coliforms or *Escherichia coli* (*E. coli*) [i.e., the test result indicated—0 cfu/100 ml], testing the water by membrane filtration for fecal contamination of the water by bacteria found in high numbers in animal feces—detected no presence of fecal enterococci [i.e., the test result indicated—0 cfu/100 ml].

Figure 2:
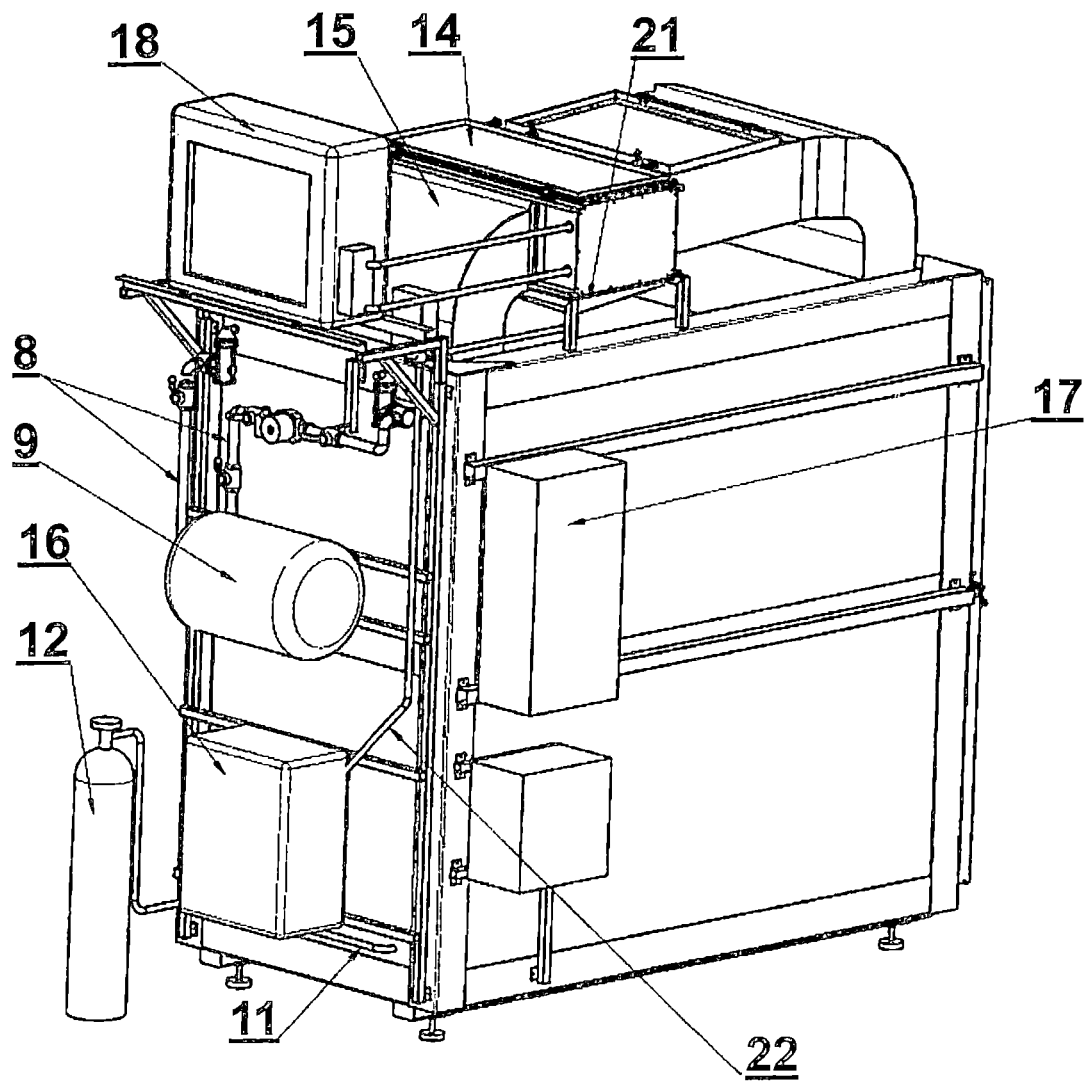
FIG. 2 depicts a back view of one embodiment of the invention.
Figure 3:
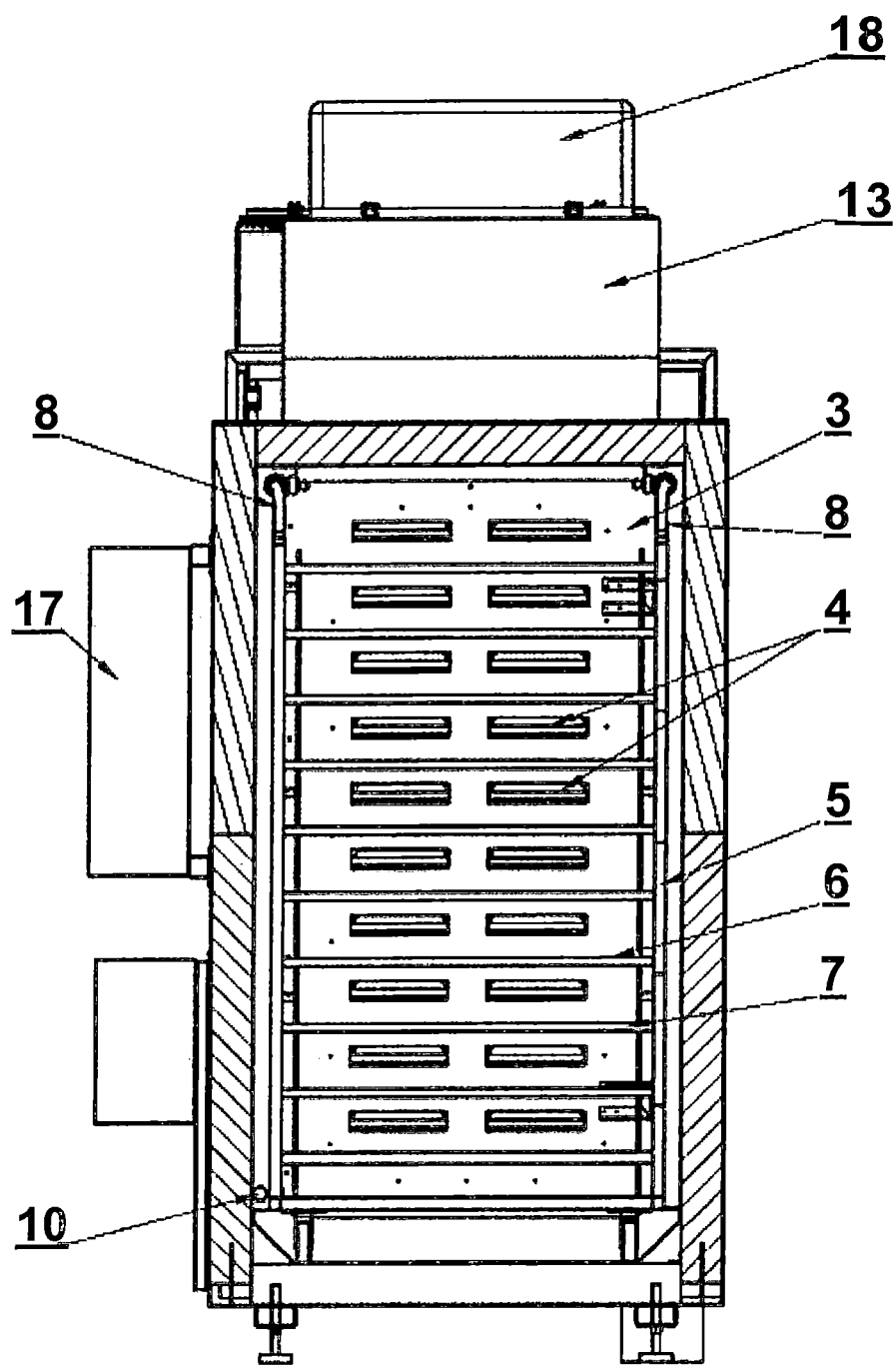
FIG. 3 depicts a side view of one embodiment of the invention.
Figure 4:
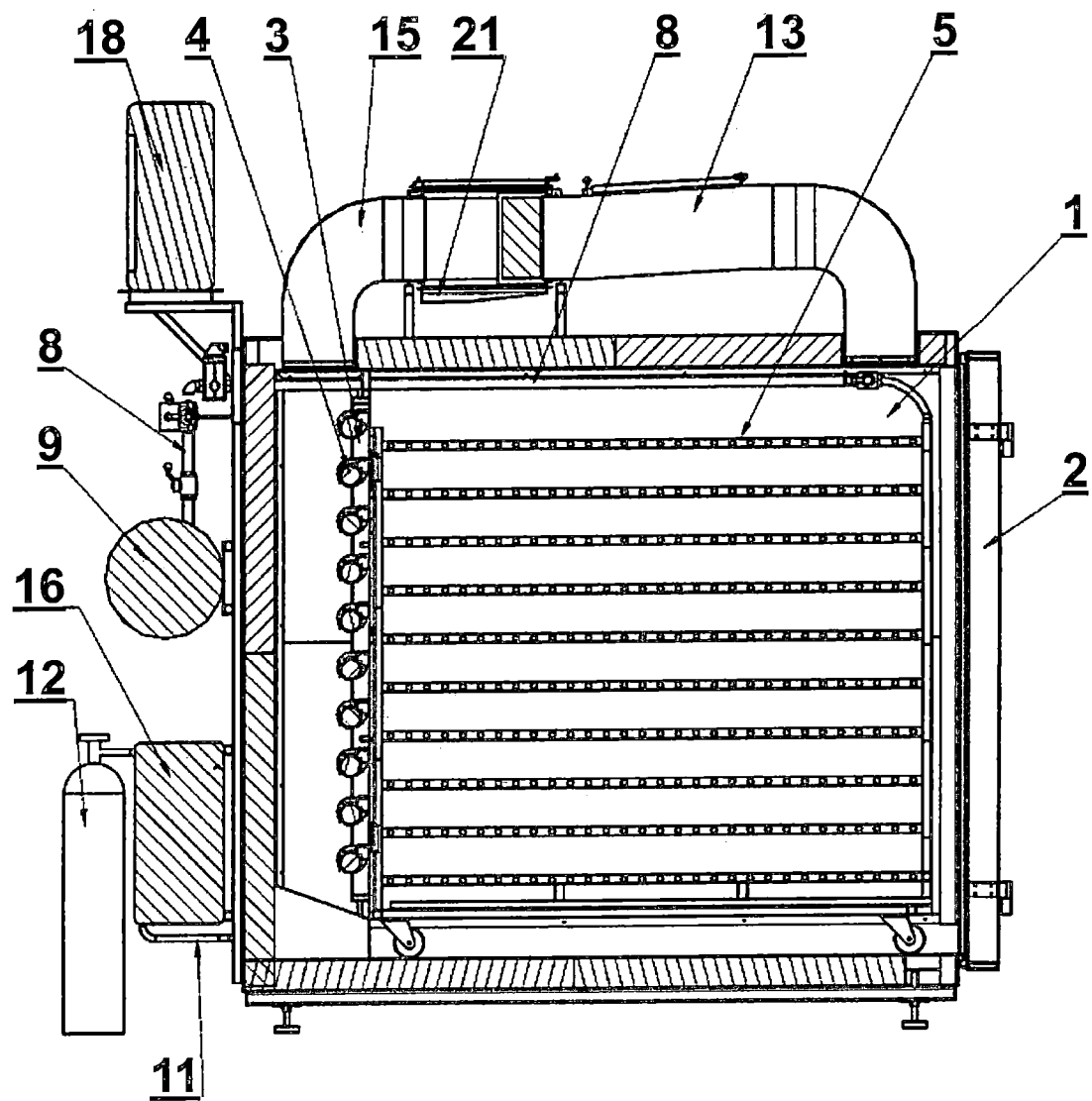
FIG. 4 depicts a cut-away view of one embodiment of the invention.
Figure 5:
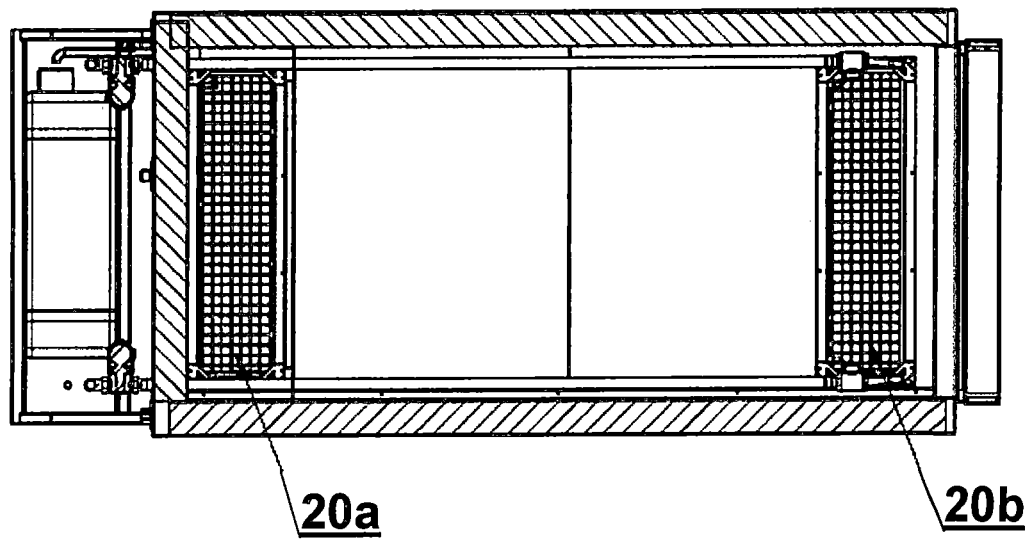
FIG. 5 depicts a partial cross-section view of the dewatering chamber of one embodiment.
Figure 6:
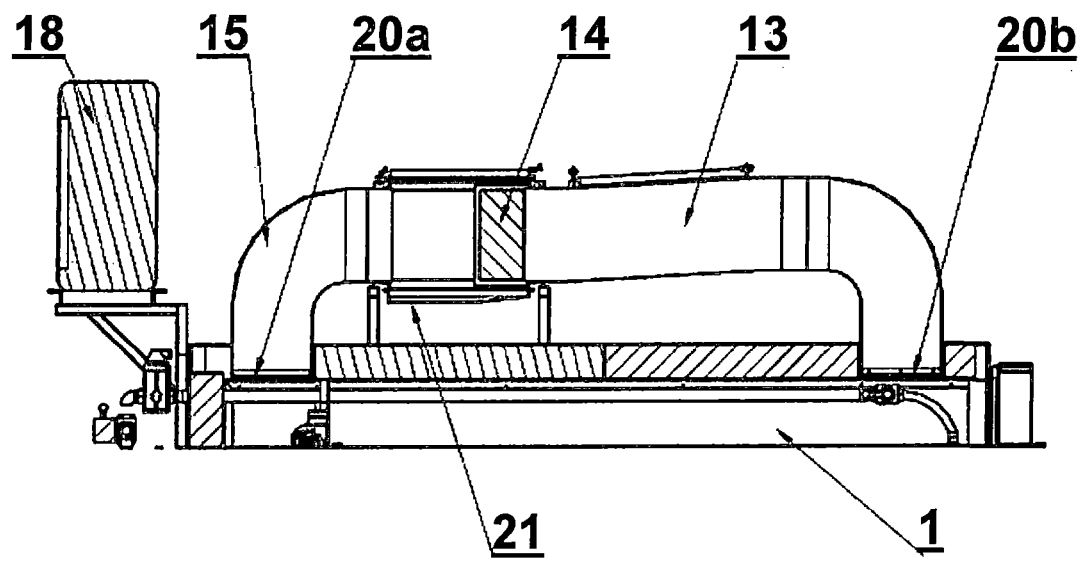
FIG. 6 depicts a view of a flow channel of one embodiment.
Figure 7:
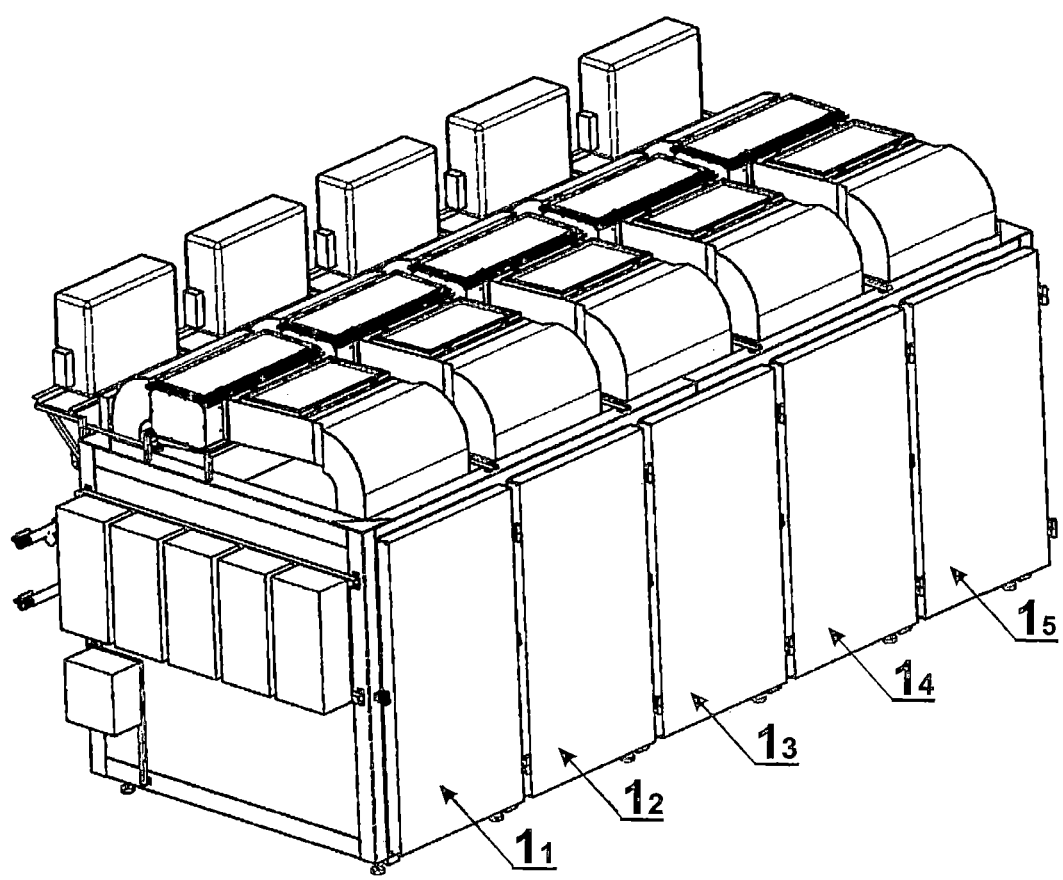
FIG. 7 depicts a view of multiple independent stations for use in one embodiment.

The subject matter of the invention is explained and exemplified by a drawing, where FIG. 1 presents a device for dewatering, provided with elements allowing for extracting crystal clear water from the dewatered biological products according to the invention in side view;

FIG. 2—The same dewatering device in a rear perspective view;

FIG. 3—shows a cross-section of the device longitudinally;

FIG. 4—the device in partial view and partial cross-section;

FIG. 5—cross-section of the dewatering chamber in top view;

FIG. 6—view of the flow channel FC with visible disinfection wire grids (with one grid located at the dewatering chamber outflow channel and the second grid located at the dewatering chamber inflow channel);

FIG. 7—container in perspective view with five identical but independent stations (sections) visible.

The device for dewatering biological products consisting of three systems: blowing system, heating system and setting-control system has been retrofitted with elements allowing for obtaining clean drinking water from the dewatered biological products.

The device has a dewatering chamber 1 made of acid-resistant steel, with thermal insulation in the form of a layer of polystyrene foam, not shown on the drawing. Additionally, the dewatering chamber 1 is insulated with an anti-moisture layer not shown in the figure and lined on the inside with waterproof elements also not shown in the figure. The dewatering chamber 1 is opened and closed hermetically by means of the door 2. In the rear wall 3 of the dewatering chamber 1, there are turbine fans 4, with individual capacity control, directing the movement of the gases in the blowing system.

When the device is in operation, inside the dewatering chamber 1 a rack 5 with a tubular structure is placed, having several shelves 6 with heating elements 7 consisting of parallel pipes through which water flows. On each of the shelves 6 perforated drying trays are placed, not shown in the figure, on which the moist raw material to be subjected to the drying process is laid. The drying trays are made of copper, covered with a shielding layer and framed with an insulating element. The rack 5 together with the heating elements 7 of the shelves 6 is detachably connected (by means of self-closing couplings not shown in the figure) by pipes 8 to the heater 9, located outside the system. The rack 5 plays a double role in the device—of a drying cart and at the same time of a heat exchanger in the heating system. Inside the dewatering chamber 1 there are also components supplying nitrogen into the chamber, namely injectors 10, connected by a pipe 11 to a nitrogen container 12 located outside the system, i.e. outside the dewatering chamber 1.

Above the dewatering chamber 1 there is a flow channel FC, constituting a closed circuit, connected to the chamber 1 by two openings—an inflow and outflow opening, and which flow channel FC comprises two parts—i.e. an outflow channel 13 (through which humid gas medium escapes during the dewatering process) and an inflow channel 15 (through which the dehydrated gas medium is forced back into the interior of the dewatering chamber 1 by means of fans 4). Between the outflow channel 13 and the inflow channel pipe 15, there is a condenser 14.

Apart from the system, the device has a special water storage tank 16 and a setting and control system 17, located on one of the outer side walls of the dewatering chamber 1, allowing to control the humidity and pressure inside the dewatering chamber 1.

In addition, the device is equipped with components for extracting clean drinking water from the dewatered biological products, all of which are located outside the hermetic dewatering chamber 1.

Thus—in the FC flow channel, in two places there are two replaceable disinfectant wire grids 20, made of silver (i.e. silver-coated) wire, designed to have a bactericidal, disinfecting (antiseptic) effect on the vapour escaping from the dewatering chamber 1. One of them, i.e. the wire grid 20*a*-constitutes a first barrier through which the humid vapour escapes from the dewatering chamber 1, the wire grid 20*a* is installed in the outflow channel 13, in the space between the upper outflow opening of the dewatering chamber 1 and the condenser 14, made of acid-resistant steel.

A second wire grid 20*b*—constitutes a further barrier through which the already dehydrated vapour enters, the said wire grid 20*b* being installed in the inflow channel 15, in the space between the condenser 14 and the upper inflow opening of the dewatering chamber 1, i.e. in the space in which the dry vapour is re-injected by means of the fans 4 inside the dewatering chamber 1.

On the outer side wall of the dewatering chamber 1, at the side adjacent to the upper inflow opening of the dewatering chamber 1, them is a cooling unit in the form of a refrigerating unit 18, cooling the condenser 14 with ice water, in order to cause the "dew point" at the point where warm gases coining out of the dewatering chamber 1 come into contact with the condenser 14 in which—at the temperature of the cooled condenser 14 within the range of +5° C. to +15° C.—the process of condensation of water vapour begins.

Inside the condenser 14 there are densely mounted lamellas 19, made of acid-resistant steel, connected to each other—similarly to the heater—by a tubular spiral, on which lamellas 19 the water vapour that penetrates from the flow channel to the condenser 14 condenses and turns into water.

Under the condenser 14 there is a condensate discharge tub 21, made of acid-resistant steel, connected to a sterile flow duct, which is a system of pipe connections 22, and which is connected to a special tank used for storing water 16, also made of acid-resistant steel.

The presented device for dewatering biological products was used to dry a batch of 500 kg of sauerkraut and 500 kg of pickled onion and simultaneously recover water from both products undergoing the drying process.

For this purpose, 5 independent drying stations were set up in a single container, five-station unit, i.e., five hermetic dewatering chambers $1_1$, $1_2$, $1_3$, $1_4$, and $1_5$, each of which contained its own external installation for recovering water from the products undergoing the drying process inside the dewatering chamber (drying chamber).

For this purpose, after the initial preparation, the machine operator sorted the products. He then brought the segregated products on unloading carts to the container assembly of the dewatering chamber 1 and placed the pickled cabbage in single layers on the appropriate drying trays in the drying stations $1_1$, $1_2$, $1_3$, after which the trays were placed on the heating elements 7 of the mobile rack 5 shelves 6 having wheels attached, which stood in a room outside the device. He did the same with the pickled onion, placing it on appropriate drying trays constituting the drying stations $1_4$ and $1_5$, after which he placed the individual drying trays loaded with pickled onions on the heating elements 7 of the mobile rack 5 shelves 6.

After that he tightly closed the door 2 of this chamber. Then, the operator activated the injectors 10 in each of the chambers (i.e., chambers $1_1$, $1_2$, $1_3$, $1_4$, and is), which began to supply nitrogen into each chamber, stored in a cylinder 12 provided with each device. The nitrogen temperature was plus 40° C. After waiting for 10 minutes, during which time the atmosphere in each dewatering chamber (i.e., chambers $1_1$, $1_2$, $1_3$, $1_4$, and $1_5$) changed, causing the aerobic bacteria to disappear, the operator activated all the components of the device $1_1$, $1_2$, $1_3$, $1_4$, and $1_5$, and the setting and control system 17 of each device automatically adjusted all parameters of the dewatering process, including temperature, humidity, and pressure inside each of the dewatering chambers (i.e., chambers $1_1$, $1_2$, $1_3$, $1_4$, and $1_5$), which reached 1.2 Pa as intended.

The process of dewatering both biological products, i.e. sauerkraut in chambers $1_1$, $1_2$, $1_3$ and pickled onion in chambers $1_4$, and $1_5$, was started. The products were simultaneously subjected to two processes via two systems (blowing and heating system)—the blowing process first utilising nitrogen, then air, with simultaneous desorption drying, which involved raising the temperature of the product to plus 45° C. by the thermal energy released from the heating system by the heating elements 7 of the shelves 6 in contact with the drying trays. As a result of the two processes, dehydration of the produce proceeded until the moisture content of the dried vegetables was reduced to the desired level of less than 2%.

During the entire dewatering cycle, water from the sauerkraut and from the pickled onion was evaporating and the vapour that came from the dewatered products was removed from all five chambers, i.e., chamber $1_1$, $1_2$, $1_3$, $1_4$ and $1_5$ continuously through a water condensation system.

During the process the humid vapour was escaping through an outflow opening of each dewatering chamber ($1_1$, $1_2$, $1_3$, $1_4$ and $1_5$), into the flow channel FC located above each of the chambers and, entering through the part of the channel which constitutes the outflow channel 13, flowed through one of the disinfectant wire grids 20 made of silver (i.e., silver-coated) wire. Then, after reaching the condenser 14, cooled by ice water coming from the refrigerating unit 18, located in the middle of the flow channel FC (i.e. between the outflow channel 13 and the inflow channel 15)—at a temperature ranging from +5° C.—to +15° C.—the moist and, at the same time, warm water vapour, as a result of rapid cooling, reached the state of saturation, the "dew point" occurred, in which the water vapour became supersaturated and the process of its condensation began.

The vapour condensed on the densely arranged lamellas 19 made of acid-resistant steel and located inside the condenser 14. The water formed in the condenser 14 flowed into the condensate discharge tub 21, made of acid-resistant steel, located under the condenser 14, and from there through a sterile flow duct, which is a system of pipe connections 22, flowed into a special water storage tank 16, also made of acid-resistant steel, with the water recovered in the process of dewatering the sauerkraut, carried out in dewatering chambers $1_1$, $1_2$ and $1_3$ went to tanks $16_1$, $16_2$ and $16_3$, while water recovered from the dewatering of pickled onions went to tanks $16_4$ and $16_5$ connected to dewatering chambers $1_4$ and $1_5$.

At the same time—dry, i.e., dehydrated vapour, flew from the condenser 14 into the second part of the flow channel FC and, passing through the inflow channel 15, was injected again by means of the fans 4 into the dehydration chamber, i.e., into chamber 1 and chamber $1_1$, respectively, on the way encountering another barrier in the form of a second disinfectant wire grid 20b.

By means of the setting and control system 17 located on one of the outer side walls of chamber 1, the person operating both devices was able to systematically control the humidity and pressure inside each section of the dewatering chambers (i.e. $1_1$, $1_2$, $1_3$, $1_4$ and $1_5$).

When the dewatering process was completed, the operator of the device, using the setting and control system 17, stabilized all parameters, including the temperature and pressure inside each section of the dewatering chambers (i.e. $1_1$, $1_2$, $1_3$, $1_4$ and $1_5$), then turned off each piece of equipment, after which opened the door 2 of each chamber, took the racks 5 out of the chambers, and removed the drying trays one by one with the finished dried product, namely dried sauerkraut and dried pickled onion. At the same time, independent water storage tanks—i.e. tank $16_1$, $16_2$, $16_3$, $16_4$ and $16_9$ were filled with clean drinking water obtained from the dried products—i.e. sauerkraut water and pickled onion water, respectively.

The obtained products in two different forms, i.e., in dried form and as water, were subjected to thorough laboratory tests conducted at the Faculty of Food Sciences and Nutrition, Department of Plant-Based Food Technology, Poznań University of Life Sciences, which established the following very favorable parameters:

TESTED PRODUCT - SAUERKRAUT

| Tested product | Sauerkraut dried product | water |
|---|---|---|
| Basic composition (g/100 g) | | |
| dry substance | 82.38 ± 0.2 | 0.02 |
| total protein | 12.37 ± 0.88 | nd |
| total fat | 0.71 ± 0.06 | nd |
| fibre | 8.47 ± 0.46 | not determined |
| total reducing sugar (mg/l) | not determined | nd |
| Bx | not determined | 0.3 |
| Vitamins (mg/100 g) | | |
| C | 74.2 | 1.1 |
| B1 | 0.2 | 0.01 |
| B2 | 1.1 | 0.01 |
| B3 | 0.24 | 0.03 |
| B6 | 1.2 | 0.04 |
| B9 | 0.9 | 0.01 |
| B12 | 5.1 | 0.02 |
| A | 0.9 | nd |
| E | 3.7 | nd |
| K | 2.1 | nd |
| FC | 1.1 | nd |
| Phenolic acids (mg/100 g or 100 ml) | | |
| total mg (GAE/100 g or 100 ml) | 128.52 | nd |
| Gallic | 65.26 | nd |
| Chlorogenic | 4.26 | nd |
| ferulic | 1.02 | nd |
| Caffeic | 1.15 | nd |
| 2,4-dihydroxybenzoic | 0.21 | nd |
| Protocatechuic | nd | nd |
| 4-hydroxybenzoic | 1.49 | nd |
| t-cinnamic | nd | nd |
| Flavonoids (mg/100 g or 100 ml) | | |
| total mg (RE/100 g or 100 ml) | 4.56 | nd |
| Luteolina | 0.35 | nd |
| Kaempferol | 0.72 | nd |
| Quercitin | 0.56 | nd |
| Naringenin | 2.34 | nd |
| Apigenin | 1.93 | nd |
| Carotenoids (mg/g) | | |
| Lutein | 12.4 | nd |
| Zeaxanthin | 20.4 | nd |
| Anthocyanins (mg/100 g) | | |
| Betanin | nd | nd |
| Betaine | nd | nd |
| Phytosterols (mg/g) | | |
| beta-sitosterol | 45.2 | nd |
| stigmasterol | 2.3 | nd |
| campesterol | 1.8 | nd |
| avenasterol | 0.9 | nd |
| Fatty acids (%) | | |
| total: | 100 | nd |
| C10:0 (Capric) | 0 | nd |
| C12:0 (Lauric) | 0 | nd |
| C14:0 | 0 | nd |
| C15:0 (pentadecanoic acid) | 0.09 | nd |
| C15:1 (pentadecenoic acid) | 0 | nd |
| C16:0 (palmitic acid) | 23.6 | nd |
| C16:1 (palmitoleic acid) | 0 | nd |
| C17:0 (heptadecanoic acid) | 0 | nd |
| C17:1 (heptadecenoic acid) | 0 | nd |
| C18:0 (stearic acid) | 29.3 | nd |
| C18:1 (oleic acid) | 10.3 | nd |
| C18:2n6 (linoleic acid) | 1.3 | nd |
| C18:3n6 (γ-linolenic acid) | 0.3 | nd |
| C18:3n3 (linolenic acid) | 9.8 | nd |
| C20:0 (arachidic acid) | 1.3 | nd |
| C20:1 (c-11-eicosenoic acid) | 17.6 | nd |
| C20:2 (eicosadienoic acid) | 1.8 | nd |
| C21:0 (heneicosanoic acid) | 0.1 | nd |
| C22:1 (erucic) | 0.31 | nd |
| C22:6 n-3 | 3.2 | nd |
| C24:0 (tetracosanoic) | 0 | nd |
| C24:1 (nervonic) | 1 | nd |
| Mineral components | | |
| Calcium (mg/100 g) or mg/100 ml) | 692.43 | 0.11 |
| Iron (mg/100 g) or mg/100 ml) | 4.17 | 0.02 |
| Magnesium (mg/100 g) or mg/100 ml) | 111.81 | 0.01 |
| Phosphorus (mg/100 g) or mg/100 ml) | 34 | nd |
| Potassium (mg/100 g) or mg/100 ml) | 282 | nd |
| Sodium (mg/100 g) or mg/100 ml) | 352 | 6 |
| Zinc (mg/100 g) or mg/100 ml) | 13.81 | 0.02 |
| Copper (mg/100 g) or mg/100 ml) | 0.29 | 0.04 |
| Manganese (mg/100 g) or mg/100 ml) | 1.55 | nd |

LEGEND:
nd—not detected
GAE—gallic acid
RE—rutin equivalents

TESTED PRODUCT - PICKLED ONION

| Tested product | Pickled onion dried product | water |
|---|---|---|
| Basic composition (g/100 g) | | |
| dry substance | 82.25 ± 0.12 | 0.01 |
| total protein | 8.60 ± 0.94 | 0.05 ± 0.03 |
| total fat | 0.58 ± 0.03 | not determined |
| fibre | 2.85 ± 0.28 | not determined |
| total reducing sugar (mg/l) | not determined | 0.33 ± 0.004 |
| Bx | not determined | 0.3 |
| Vitamins (mg/100 g) | | |
| C | 3.6 | 0.4 |
| B1 | 4.8 | 0.05 |
| B2 | 0.9 | 0.01 |
| B3 | nd | nd |
| B6 | nd | nd |
| B9 | 47.3 | 0.2 |
| B12 | nd | nd |
| A | nd | nd |
| E | nd | nd |
| K | nd | nd |
| PP | nd | nd |
| Phenolic acids (mg/100 g or 100 ml) | | |
| total mg (GAE/100 g or 100 ml) | 131.56 | 2.1 |
| gallic | 33.23 | 1.26 |
| chlorogenic | 1.11 | nd |
| ferulic | 2.34 | nd |
| caffeic | 3.01 | nd |
| 2,4-dihydroxybenzoic | 1.53 | nd |
| protocatechuic | 4.85 | nd |
| 4-hydroxybenzoic | nd | nd |
| t-cinnamic | nd | nd |
| Flavonoids (mg/100 g) | | |
| total mg (RE/100 g) | 22.95 | nd |
| luteolin | 0.63 | nd |
| kaempferol | 2.42 | nd |
| quercitin | 21.35 | nd |

-continued

TESTED PRODUCT - PICKLED ONION

| Tested product | Pickled onion | |
|---|---|---|
| | dried product | water |
| naringenin | 1.21 | nd |
| apigenin | nd | nd |
| Carotenoids (mg/g) | | |
| lutein | 12.4 | nd |
| zeaxanthin | 20.4 | nd |
| Anthocyanins (mg/100 g) | | |
| betanin | nd | nd |
| betaine | nd | nd |
| Phytosterols (mg/g) | | |
| beta-sitosterol | nd | nd |
| stigmasterol | nd | nd |
| campesterol | nd | nd |
| avenasterol | nd | nd |
| Fatty acids (%) | | |
| total: | 100 | nd |
| C10:0 (Capric) | nd | nd |
| C12:0 (Lauric) | nd | nd |
| C14:0 | nd | nd |
| C15:0 (pentadecanoic acid) | nd | nd |
| C15:1 (pentadecenoic acid) | nd | nd |
| C16:0 (palmitic acid) | 10.4 | nd |
| C16:1 (palmitoleic acid) | 0.36 | nd |
| C17:0 (heptadecanoic acid) | nd | nd |
| C17:1 (heptadecenoic acid) | nd | nd |
| C18:0 (stearic acid) | 2.56 | nd |
| C18:1 (oleic acid) | 17.2 | nd |
| C18:2n6 (linoleic acid) | 13.4 | nd |
| C18:3n6 (y-linolenic acid) | nd | nd |
| C18:3n3 (linolenic acid) | 34.88 | nd |
| C20:0 (arachidic acid) | 0.1 | nd |
| C20:1 (c-11-eicosanoic acid) | 19.6 | nd |
| C20:2 (eicosadienoic acid) | 1.1 | nd |
| C21:0 (heneicosanoic acid) | nd | nd |
| C22:1 (erucic) | nd | nd |
| C22:6 n-3 | nd | nd |
| C24:0 (tetracosanoic) | 0.2 | nd |
| C24:1 (nervonic) | 0.2 | nd |
| Mineral components | | |
| Calcium (mg/100 g) or mg/100 ml) | 437.05 | 0.25 |
| Iron (mg/100 g) or mg/100 ml) | 5.41 | nd |
| Magnesium (mg/100 g) or mg/100 ml) | 57.09 | 0.01 |
| Phosphorus (mg/100 g) or mg/100 ml) | 29 | nd |
| Potassium (mg/100 g) or mg/100 ml) | 211 | nd |
| Sodium (mg/100 g) or mg/100 ml) | 426 | nd |
| Zinc (mg/100 g) or mg/100 ml) | 9.39 | 0.02 |
| Copper (mg/100 g) or mg/100 ml) | 0.52 | 0.01 |
| Manganese (mg/100 g) or mg/100 ml) | 0.88 | nd |

LEGEND:
nd—not detected
GAE—gallic acid
RE—rutin equivalents

SUMMARY DESCRIPTION

The subject matter of the invention is a method for obtaining pure drinking water from dewatered biological products, which accompanies the dewatering process of these products, carried out in a hermetic dewatering chamber, isolated from the ambient atmosphere, and which runs in parallel with the process during which the dried products placed on drying trays, arranged on at least one rack with shelves having heating surfaces, are tightly closed inside a hermetic dewatering chamber, the products having already undergone an initial phase of being subjected to a gas medium in the form of nitrogen at temperatures from 30° C. to 50° C. and the pressure from 1.1 do 1.4 Pa inside the dewatering chamber, after which the actual dewatering phase begins, initiated by activating all the components of the device, where all the parameters of the dewatering process such as temperature, humidity and appropriate pressure inside the dewatering chamber are controlled automatically by a setting and control system, after which phase the raw material is subjected to two simultaneous processes with the use of the blowing and heating systems, i.e., the process of being blown with a gas medium that flows through a batch of biological product at positive pressure and a predetermined temperature of 30° to 45°, and the process of desorption drying induced by shelf heating surfaces, which involves heating the product to a temperature of 40-45° C. by the heat released from the heating system and the vapour originated/released from the dewatered products is continuously removed from the dewatering chamber through the upper opening, exits through the outflow channel and enters through the flow channel (air duct) the condenser, located outside the dewatering chamber, and the condensate is directed to a special container, also located outside the dewatering chamber. According to the essence of the invention, the process of obtaining pure drinking water is carried out outside the dewatering chamber (1), the process being carried out in several stages, in which:

a) warm vapour, originating from the dewatered products, escaping continuously through the upper opening of the dewatering chamber (1) into the outflow channel (13) forming part of the flow channel (FC), located outside the dewatering chamber (1), flows through wire disinfectant grids (20) placed in the channel (FC), b) then the vapour flows towards the condenser (14) made of acid-resistant steel which is cooled down by a refrigerating unit (18) whereby as a result of the cooling of the condenser (14), at the point where warm gases leaving the dewatering chamber (1) come into contact with the condenser (14), the "dew point" occurs, where—at the temperature of cooled condenser (14) ranging from +5° C. to +15° C., the process of gas condensation begins, c) the vapour condenses on the densely arranged lamellas (19) made of acid-resistant steel and located inside the condenser (14), d) next, fans (4) pump the vapour, and the condensate generated from the condensation of the vapour is directed in sterile conditions from the condenser (14) to a condensate discharge tub (21), e) the condensate goes into a flow duct (i.e. pipes or a hose) (22) and it flows through it in sterile conditions into a special water storage tank (16).

The subject matter of the invention is also a device for dewatering such products, provided with elements allowing for extracting crystal clear water from the dewatered biological products, being an improvement of the design of the device constituting a physically and thermally closed unit, with a hermetic dewatering chamber (1) fitted with a door (2) and connected by pipes with a condenser (14) located outside, inside which chamber a heat exchanger is located, with the said heat exchanger having the form of a rack (5), whose entire supporting structure is filled with heating liquid and the rack (5) has shelves (6) on which drying trays filled with dewatered biological raw material are stacked one over another, additionally the rack (5) is detachably connected to the heater (9) by a supply and outflow pipeline located outside the dewatering chamber (1), and has a system for introducing nitrogen and bacteriostatic agents inside the dewatering chamber (1), comprising a nitrogen container

(12) placed outside the dewatering chamber (1), which is connected by pipes (11) to injectors (10) located at the floor of the dewatering chamber (1) and equipped with a system for forcing the flow of a gas medium at a predetermined pressure and in the rear wall of the dewatering chamber (4) at the height of each tray shelf (6), fans (4)—preferably turbine once—with individual capacity control are placed that blow a gas medium into the dewatering chamber (1), into the spaces between the drying trays and apart from that, the device has an automated setting and control system (17), which controls the process parameters as well as a container (16), also located outside the dewatering chamber (1), for collecting the condensate. According to the invention in the flow channel (FC) located above the dewatering chamber (1), in which the gas medium flows in a closed circuit, there are at least two replaceable disinfection wire grids (20), of which at least one grid (20) is located in the outflow channel (13), being part of the flow channel (FC), in the space between the upper opening of the dewatering chamber (1) and the condenser (14), forming a vessel located in the middle of the flow channel (FC), made of acid-resistant steel, and at least one disinfectant wire grid (20) is located in the inflow channel (15) which is also a part of the flow channel (FC), in the space between the condenser (14) and the upper inflow opening of the dewatering chamber (1) (through which dehydrated vapour returns to the dewatering chamber (1)), and apart from that, outside the dewatering chamber (1), at a side adjacent to the upper opening constituting the inflow channel (15), there is a refrigeration unit (18) which cools the condenser (14) by ice water and causes the "dew point", at which the gas condensation process begins, and inside the condenser (14) them are densely mounted lamellas (19), made of acid-resistant steel, connected to each other by a tubular spiral, under the condenser (14) there is a condensate discharge tub (21), also made of acid-resistant steel, connected to the sterile flow duct (22), connected to a special sterile water storage tank (16).

LIST OF MARKINGS

1—dewatering chamber
2—dewatering chamber door
3—rear side of the dewatering chamber
4—fan
5—rack
6—shelf
7—heating element
8—heating system pipe
9—heater
10—injector
11—nitrogen system line
12—nitrogen container
FC—flow channel
13—humid gas medium outflow channel
14—condenser
15—dewatered gas medium inflow channel
16—water reservoir
17—setting and control system
18—refrigerating unit
19—lamellas inside the condenser 14
20—disinfectant wire grids
21—condensate discharge tub
22—pipe connections, connecting the condenser 14 with water reservoir 16.

The embodiment of the invention in which an exclusive property or privilege is claimed is defined as follows:

1. A physically and thermally closed-circuit device for dewatering products, provided with elements allowing for extracting crystal clear water from dewatered biological products, comprising:
   a condenser;
   a heater;
   a dewatering chamber;
   a system for introducing nitrogen and bacteriostatic agents comprising a nitrogen container placed outside the dewatering chamber;
   an automated setting and control system, which controls process parameters;
   a collection container;
   at least two disinfectant grids;
   a hermetic dewatering chamber containing a heat exchanger and fitted with a door and connected by pipes with the condenser located outside the chamber;
   wherein the heat exchanger comprising a rack, whose supporting structure is filled with heating liquid and the supporting structure defining shelves on which drying trays filled with dewatered biological raw material are stacked; the rack is detachably connected to the heater by an inflow and outflow pipeline located outside the dewatering chamber, and the system for introducing nitrogen and bacteriostatic agents to the dewatering chamber, which is connected by pipes to injectors located at a floor of the dewatering chamber and is equipped with a system for forcing flow of a gas medium at a predetermined pressure; at least one fan located in a rear wall of the dewatering chamber, at a height of each tray shelf, with individual capacity control are placed that blow a gas medium into the dewatering chamber, into spaces between the drying trays
   a flow channel located over the dewatering chamber, in which a gas medium flows in a closed circuit, there are at least two replaceable, disinfectant wire grids, of which at least one grid is located in the outflow channel in the space between an upper opening of the dewatering chamber and the condenser
   a vessel defined in middle of the flow channel, made of acid-resistant steel, and furthermore at least one disinfectant wire grid is located in the inflow channel to the chamber, also forming part of the flow channel, in the space between the condenser, and the upper inflow opening of the dewatering chamber;
   a refrigerating unit which cools the condenser with ice water and changes a dew point where the process of condensation of the gas begins, inside the condenser there are densely mounted lamellas, made of acid-resistant steel, connected to each other by a tubular spiral; and
   a condensate discharge tub, also made of acid-resistant steel, connected to a sterile flow duct, connected to a special sterile water storage tank under the condenser.

2. The device according to claim 1, wherein replaceable wire disinfectant grids are made from copper.

3. The device according to claim 1 wherein replaceable wire disinfectant grids further comprise silver addition to wire.

4. The device according to claim 1 wherein the sterile flow duct comprises a hose line.

5. The device according to claim 1 wherein the sterile flow duct comprises a system of pipes.

6. The device according to claim 1 wherein the refrigeration unit is connected an inflow channel to the dewatering chamber allowing dehydrated vapor to reenter the dewatering chamber, wherein the refrigeration unit is located outside the dewatering chamber.

7. The device according to claim 4 wherein the sterile flow duct comprises a system of pipes.

8. The device according to claim 2 wherein replaceable wire disinfectant grids further comprise silver addition to wire.

* * * * *